United States Patent Office 3,045,022
Patented July 17, 1962

3,045,022
PROCESS OF PREPARING ETHYNYLPYRIDINES
Charles K. McGill, Indianapolis, Ind., assignor to Reilly Tar & Chemical Corporation, Indianapolis, Ind., a corporation of Indiana
No Drawing. Filed Apr. 7, 1960, Ser. No. 20,528
7 Claims. (Cl. 260—290)

My invention relates to a process of preparing ethynylpyridines. More specifically, it relates to a process of preparing 2-ethynylpyridines and 4-ethynylpyridines having the general formulae:

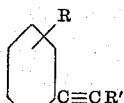

and

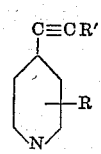

wherein R is hydrogen or lower alkyl, and R' is hydrogen, alkyl, substituted alkyl, or aryl.

My process of preparing ethynylpyridines comprises the interaction of an alkali-metal acetylide, such as sodium acetylide, lithium acetylide, or potassium acetylide, with a quaternary pyridinium salt of a pyridine-N-oxide:

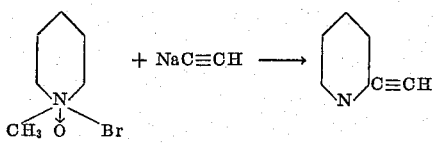

and

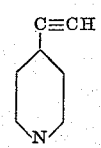

Illustrative of the manner in which my invention may be practiced, I cite the following examples.

EXAMPLE 1

2-Ethynylpyridine and 4-Ethynylpyridine

To a solution composed of 190 grams of the methyl bromide quaternary salt of pyridine-N-oxide in 500 grams of dioxane, maintained at room temperature, I add a suspension of 48 grams of sodium acetylide in 200 grams of dioxane. As the sodium acetylide is added, a reaction occurs whereby 2-ethynylpyridine and 4-ethynylpyridine are formed. After all of the sodium acetylide has been added, the mixture is stirred for an additional hour. Then the mixture of ethynylpyridines is separated from the dioxane in any convenient manner, such for example as by fractional distillation under vacuum.

In place of the dioxane solvent I can use other nonpolar solvents, such for example as diethyl ether, or mixtures of dioxane and diethyl ether, etc.

I need not conduct the reaction at room temperature. I can, if desired, carry out the reaction at temperatures of about 0° C. or even at lower temperatures. Or I can conduct the reaction at elevated temperatures of the order of 40–50° C.; I prefer to keep the reaction temperature below about 60° C. as the quaternary salt of the pyridine-N-oxide seems to be unstable at higher temperatures with a resultant loss of yield.

I need not use the methyl bromide quaternary salt of the pyridine-N-oxide. Instead I can use other alkyl halide quaternary salts of pyridine-N-oxide, or I can use the methyl sulfate quaternary pyridinium salt of the —N—oxide. The quaternary salts which are useful in carrying out my process have the general formula:

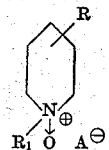

wherein R is hydrogen or lower alkyl, $R_1$ is alkyl, aryl, or pyridyl alkyl, and $A^\ominus$ is an anion.

EXAMPLE 2

2-Ethynyl-4-Methylpyridine

The procedure of Example 1 is repeated with the exception that I use 225 grams of the methosulfate 4-picoline-N-oxide quaternary salt in place of the methyl bromide quaternary salt of pyridine-N-oxide, and I recover 2-ethynyl-4-methylpyridine.

EXAMPLE 3

2-Ethynyl-3-Methylpyridine

The procedure of Example 2 is repeated with the exception that I use the methosulfate quaternary of 3-picoline-N-oxide in place of the methosulfate quaternary of 4-picoline-N-oxide, and I recover 2-ethynyl-3-methylpyridine.

EXAMPLE 4

2-Ethynyl-3-Ethyl-6-Methylpyridine

The procedure of Example 1 is repeated with the exception that I use 250 grams of the methosulfate quaternary of 2-methyl-5-ethylpyridine in place of the methyl bromide quaternary of pyridine-N-oxide, and I recover 2-ethynyl-3-ethyl-6-methylpyridine.

EXAMPLE 5

2-Ethynyl-6-Methylpyridine

The procedure of Example 1 is repeated with the exception that I use 225 grams of the methosulfate quaternary of 2-picoline-N-oxide in place of the methyl bromide quaternary of pyridine-N-oxide, and I recover 2-ethynyl-6-methylpyridine.

EXAMPLE 6

2-Phenylethynylpyridine and 4-Phenylethynylpyridine

The procedure of Example 1 is repeated with the exception that I use 136 grams of sodium phenylacetylide in place of the sodium acetylide, and I recover 2-phenylethynylpyridine and 4-phenylethynylpyridine.

EXAMPLE 7

*2-Methylethynylpyridine and 4-Methylethynylpyridine*

The procedure of Example 1 is repeated with the exception that I use 68 grams of sodium methylacetylide in place of the sodium acetylide, and I recover 2-methylethynylpyridine and 4-methylethynylpyridine.

I claim as my invention:

1. The process of preparing ethynylpyridines of the class consisting of 2-ethynylpyridines and 4-ethynylpyridines which compounds have the formulae:

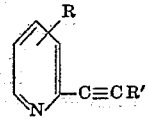

and

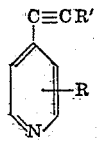

wherein R is selected from the class consisting of hydrogen and lower alkyl, R' is a member selected from the group consisting of hydrogen, alkyl, and hydrocarbon aryl, which comprises adding an alkali metal acetylide selected from the class consisting of alkali metal acetylide, alkali metal alkyl acetylides, and alkali metal hydrocarbon aryl acetylides to a non-polar solvent solution of a quaternary pyridinium salt of a pyridine-N-oxide having the formula:

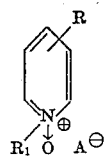

wherein R is a member of the group consisting of hydrogen and lower alkyl, $R_1$ is selected from the class consisting of alkyl, hydrocarbon aryl, and pyridyl alkyl, and $A^{\ominus}$ is an anion.

2. The process of claim 1 in which the alkali metal acetylide used is sodium acetylide.

3. The process of claim 1 in which the quaternary pyridinium salt used is the methosulfate of 4-picoline-N-oxide.

4. The process of claim 1 in which the quaternary pyridinium salt used is the methosulfate of 3-picoline-N-oxide.

5. The process of claim 1 in which the quaternary pyridinium salt used is the methosulfate of 2-methyl-5-ethylpyridine-N-oxide.

6. The process of claim 1 in which the quaternary pyridinium salt used is the methosulfate of 2-picoline-N-oxide.

7. The process of claim 1 in which the alkali metal acetylide used is sodium phenylacetylide.

References Cited in the file of this patent

Klingsberg: "Pyridine and Its Deriv.," Part 2, pp. 121, 124 (1961).